2,747,968
DRY PROCESS FOR THE RECOVERY OF SULFUR FROM GASES

Pierre Gustave Marie Adolphe Pigache, London, England

No Drawing. Application April 26, 1952,
Serial No. 284,645

Claims priority, application Great Britain May 7, 1951

1 Claim. (Cl. 23—178)

The present invention relates to a dry process for the separation and recovery of sulphur compounds from sulphur-containing gases regardless of whether they are in the form of $H_2S$, $CS_2$, COS, $SO_2$, $SO_3$, thiophenes, mercaptans, thioethers or any other sulphur-containing compounds.

The said sulphur-containing gases which can be treated according to the process of the present invention may include coal gas, water gas, producer gas, flue gases, coke oven gas, smelting gases, petroleum or tar distillation gases and any other sulphur containing gases.

The dry process such as that of the present invention has many advantages over wet processes as it involves the use of very much smaller and simpler plant and does not require the use of large amounts of power required otherwise when using wet methods.

A further advantage of the process according to the present invention is that it enables the sulphur to be recovered in a useful form and, if so desired, as elementary sulphur, liquid sulphur dioxide or sulphuric acid. Lastly the sulphur fixing mass, if correctly prepared, offers very little resistance to the sulphur-containing gases and does not agglomerate or disintegrate with use.

According to the present invention the crude gases may first be freed substantially from finely dispersed solid or condensable or volatile impurities by any known means. They are then freed from sulphur by contacting them at an elevated temperature, preferably between 100° and 300° C. with a member of the group consisting of divided copper, nickel, cadmium and oxides and salts of these metals and mixtures thereof in the presence of or in the absence of a promoter which may be selected from the group consisting of chromic acid, nickel oxide and a nickel sulphide but preferably though not necessarily incorporated with a carrier such as alumina, silica or a silicate, these carriers being in a gel, powder, or formed condition with or without the addition of substances assisting sintering of the carrier. Such substances are advantageously selected from the group consisting of $K_2S$, $Al_2S_3$, $K_2MoO_4$, $MgCO_3$ and borax. In carrying out the process mentioned above, temperatures somewhat below 100° C. may be used, but it is preferred to work at a temperature of 100° C. or higher.

In carrying out the process of sulphur fixation with crude gases of reducing character such as coal gas, water gas or producer gas, the gases are made to pass at an elevated temperature preferably 100–300° C. through a chamber or tower where they are brought into contact with the sulphur fixing agent which is in a substantially reduced state and the removal of sulphur from the gases is almost complete providing the time of contact is sufficient.

For regeneration, the sulphur-containing metal compound is then submitted at a higher temperature, preferably 350–700° C., to the action of a regenerating atmosphere where may be either hydrogen, water-vapour, a carbon-monoxide containing gas or air or two or several of these gases in succession, when sulphuretted hydrogen, sulphur carbonyl or sulphur dioxide will be obtained respectively, the fixing agent being then sufficiently regenerated for a fresh operation of S fixation.

It has also been found that many hydrocarbons, particularly those of the benzene series may, under careful condtions be fixed simultaneously with the sulphur and these are again given off in a concentrated form during regeneration.

The $H_2S$, COS or $SO_2$ obtained during regeneration as the case may be can be treated according to any method known so as to produce elemental sulphur or valuable sulphur compounds as for example by means of incomplete combustion of $H_2S$ into sulphur, pyrolytic decomposition of $H_2S$ into S and H, precipitation of S from $H_2S$ and $SO_2$ either from crude or purified gases, reduction of $SO_2$ by carbon, carbon monoxide or hydrogen this giving elemental sulphur, utilisation of $SO_2$ for direct production of sulphuric acid, further concentration and purification of the $SO_2$ by absorption or dissolution for instance in dimethylamine and/or liquefaction.

Example 1

The fixing agent is prepared by incorporating a grade of kaolin that contains as little free silica as possible in a solution of copper salt, preferably the sulphate, evaporating to a paste, forming into pellets and kilning in a gaseous stream, as for example of air or coal gas or hydrogen or of different gases used successively, to a temperature at which they assume adequate mechanical strength.

Instead of the kaolin, a fine powder of dry alumina or calcium hydrogen phosphate or barium sulphate and sodium sulphate or slightly kilned alumina or a mixture of kaolin and magnesia or kaolin and alumina or a plastic mass of alumina or alumina gel can be used with equally good results for forming the S-fixing agent.

The sulphur fixing copper compound is not of a definite composition but is a variable mixture in which have been identified metallic coper, cuprous oxide, cupric oxide and what appears to be a mixture of copper sulphide and subsulphide.

Example 2

The fixing agent is prepared as described in Example 1. Crude gases of oxidising character such as flue gases, air containing sulphur compounds, smelting gases, waste gases from sulphuric acid manufacture and other gases containing sulphur are brought into contact with the fixing agent at an elevated temperature preferably 120–300° C. when all but traces of sulphur is fixed providing the contact time is sufficiently long. It has been found however that the speed of fixation is much increased and the temperature of fixation decreased if the gases contain a little water-vapour.

By submitting the sulphur containing mass to a gentle stream of either air, hydrogen, carbon-monoxide, carbon-dioxide, steam or nitrogen or two or several of these gases successively at an elevated temperature preferably 350–700° C., a concentrated stream of sulphur dioxide is evolved and the copper fixing mass is regenerated for a subsequent operation of sulphur fixation. The recovered sulphur dioxide may be used for any purpose such as previously mentioned in Example 1.

In the above examples the use of a copper salt such as copper sulphate has been described. If desired, copper oxide may be used by mixing it into a paste with the carrier and kilning to the requisite temperature. In such a case it is preferable to use as carrier a material free from silica or alumina such as a mixture of barium sulphate and sodium sulphate in order to prevent the formation of copper silicate or copper aluminate.

Also the corresponding compounds of nickel or cadmium may be used instead of or together with the copper compounds.

Example 3

A satisfactory grade of fixing agent is composed of copper and a carrier which consists mainly of reasonably pure alumina.

Various methods can be followed to produce this material, for instance:

A formed porous alumina catalyst carrier is soaked in a solution of a copper salt and the grains are then submitted to a regeneration process the nature of which depends on the use to which the fixing agent is subsequently put, viz. whether for the desulphurization of $SO_2$-containing gases or $H_2S$-containing gases. Soaking followed by the hereinafter defined regeneration process may be carried out repeatedly so as to increase the Cu content of the catalyst carrier. Alternatively the catalyst carrier may be coated with a metal by reducing the metal salt with a reducing agent such as a sugar or hydrazine.

In order to reduce the volume of the fixing agents and therefore the size of the plant, it is advantageous to have a fixing agent of a high metal content. For that purpose plastic alumina or alumina gel—which may contain some silicate or a flux to help in the sintering process or increase the mechanical resistance of the fixing agent—are admixed with, for instance, Cu sulphate, Cu nitrate, Cu chloride, Cu carbonate, Cu hydroxide, a Cu oxide, a Cu sulphide or divided Cu. After forming, the particles of the fixing agent are submitted to calcination under such conditions that the metal is transformed into the stable Cu sulphide or oxysulphide at a temperature below 400° C., for instance by treating it with a gas containing $H_2S$, this being for the purpose of preventing the alumina from entering into combination with the metal and producing a Cu aluminate during the transition temperature at which the alumina becomes partially dehydrated before reaching the temperature necessary for regeneration. The fixing agent is then submitted to the regeneration process. The fixing agent may be mixed with fibrous asbestos to prevent channel formation or to decrease its resistance to the flow of gas.

When it is desired to carry out the regeneration of the fixing agent in such a way that the issuing gas consists essentially of a mixture of $SO_2$ and air, this operation may be conducted in one of two ways:

a. When the fixing agent has been used for desulphurization of $SO_2$ containing gases such as an oxidising gas or a mixture of $SO_2$ and reducing gases or vapours, the metal is mainly in the form of Cu sulphite and regeneration is effected at between 350–850° C. while passing a reasonably slow stream of an oxidising gas such as air over the material which leaves the metal mainly in the state of $Cu_2O$ and CuO which can then fix a further quantity of $SO_2$ from the gases to be purified.

b. When the fixing agent has been used for the desulphurization of $H_2S$-containing gases or vapours or of gases, or vapours containing organic sulphur compounds, the metal is mainly in the form of cuprous sulphide and regeneration is effected at between 350–850° C. while passing firstly over the material a slow stream of an oxidising gas such as air which causes approximately half the quantity of the fixed S to be evolved as $SO_2$, leaving the metal mainly in the form of copper oxysulphide, this being secondly followed by a slow stream of a reducing gas such as coal gas or water gas or coke oven gas which causes the balance of the S to be evolved as $SO_2$ leaving the metal mainly in the elemental state which can then fix a further quantity of S from diluted $H_2S$ or organic sulphur compounds from crude gases or vapours. The $SO_2$ can easily be separated from its mixture with the reducing gas by either passing it through the fixing agent as in (a) above in that case ultimately obtaining the $SO_2$ mixed with air, or by washing the reducing gas-$SO_2$ mixture with water as in the Hänish and Schröder process, or with a coal tar oil as in the Kuhlmann or the Pascal process, or with one of the known organic preferential solvents for $SO_2$.

I claim:

A dry process for the recovery of sulphur from gases of a reducing character which comprises the steps of reacting such gases at a temperature of 100 to 300° C. with a desulphurizing agent containing metallic copper initially prepared by calcination treatment at a temperature below 400° C. for sulphidation of the copper with a gas containing $H_2S$, incorporating with said desulphurizing agent an aluminous carrier together with a binding material assisting the sintering of said aluminous carrier, then subjecting the sulphided admixture at a temperature of about 350 to 850° C. to a process of regeneration which prevents any compound being formed between the copper and the components of the carrier, and then subjecting the resulting sulphurized copper compounds to regeneration first by treatment at 350 to 850° C. with an oxidising gas which causes approximately half the quantity of fixed sulphur to be evolved as $SO_2$ and then by treatment with a reducing gas containing hydrogen which causes the remainder of the fixed sulphur to be evolved as $SO_2$, thereby re-converting said desulphurizing agent to a condition suitable for cyclical re-use.

References Cited in the file of this patent

UNITED STATES PATENTS

| | | |
|---|---|---|
| 354,393 | Claus | Dec. 14, 1886 |
| 1,822,293 | Joseph | Sept. 8, 1931 |
| 1,900,751 | Boehr | Mar. 7, 1933 |
| 2,361,825 | Doumani | Oct. 31, 1944 |
| 2,551,905 | Robinson | May 8, 1951 |

FOREIGN PATENTS

| | | |
|---|---|---|
| 233,011 | Great Britain | May 4, 1925 |